J. A. QUICK.
Plow.
No. 58,177.
Patented Sept. 18, 1866.
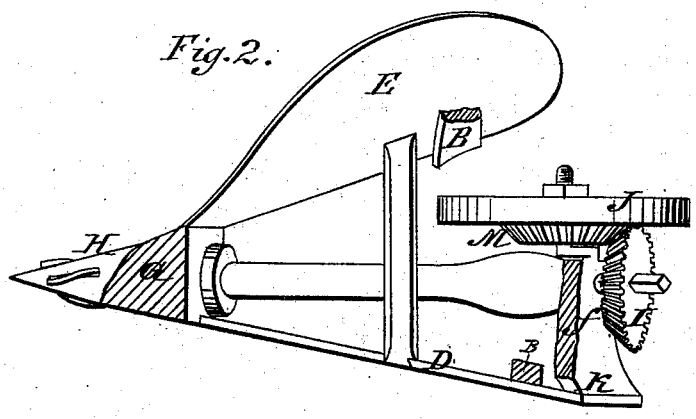
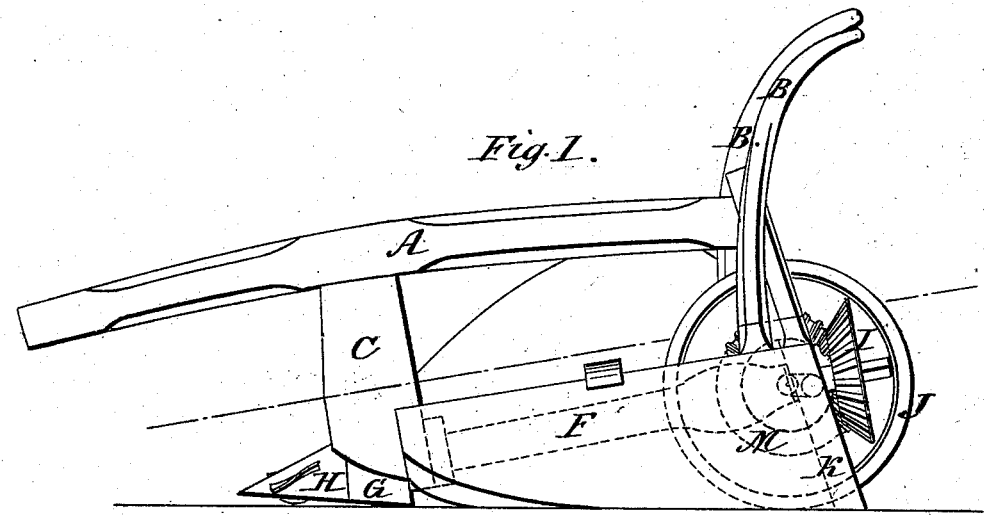
Witnesses:
Thomas J. Hurdle.
R. C. Weightman.
Inventor:
John A. Quick.
By: Munn & Co.
Attys

UNITED STATES PATENT OFFICE.

JOHN A. QUICK, OF SOUTH DANSVILLE, NEW YORK, ASSIGNOR TO HIMSELF AND CHARLES R. HOLLIDAY.

IMPROVEMENT IN PLOWS.

Specification forming part of Letters Patent No. 58,177, dated September 18, 1866.

*To all whom it may concern:*

Be it known that I, JOHN A. QUICK, of South Dansville, in the county of Steuben and State of New York, have invented a new and Improved Plow; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a side elevation. Fig. 2 is a plan view, the beam being removed.

This plow has a rotary point, which by means of a shaft and gearing is connected to the supporting-wheel, which runs in the space between the land-side and the mold-board.

The point is made detachable, and may or may not be provided with ribs, which, when present, enable it to act as a scraper, to facilitate its action in clearing away the soil and throwing it away from the land to be turned over by the mold-board.

The rotary point acts as a borer to enter the earth, and, in some soils, much facilitates the action of the plow; but it is not designed to dispense with the mold-board, which is a necessary adjunct to turn over the furrow-slice and make a clean furrow for the furrow-horse to walk in the next round.

In the drawings, A is the beam, and B B the handle, of the plow. C is the sheath or standard; D, the land-side, and E the mold-board.

Journaled in bearings $ff$ is a shaft, F, upon whose forward end is a roller, G, of the shape of a frustum of a cone, on whose projecting pin $g$ is socketed a removable point, H. Upon this point are projections or ribs, which may have a spiral arrangement, as shown in the drawings; or the ribs may be arranged straight along the sides of the cone.

On the rear end of the shaft F is a bevel-wheel, I, which engages with a wheel, M, of similar character, connected to the supporting-wheel J, which bears a portion of the weight of the plow, so as to reduce the friction of its sole upon the bottom of the furrow, and, by the motion imparted to the wheel J, rotating the gearing of the shaft F and the point H, which bores into the ground and clears out the corner of the furrow.

It will be seen that the conical point bears such relation and position to the line of the sole and land-side that its point agrees in its presentation with the angle of the furrow, and the axis of the cone and shaft tends backward away from the line of motion of the plow, thus being both upward and away from the land, the bearing $f$, as will be seen, being in the cross-piece K, which forms the transverse brace of the plow between the land-side and mold-board.

As I have before said, I do not design to dispense with the mold-board, as it is necessary to the proper disposition of the furrow-slice, rotary mold-boards having so constantly choked as to be inoperative.

The land-side is also a necessary adjunct, as the cone cannot be conveniently prolonged to a sufficient extent and height to enable it to form an efficient bearing to form a counter-resistance to the furrow-slice which is being pushed outwardly and upset by the mold-board.

What I claim as new, and desire to secure by Letters Patent, is—

The combination, with the plow having mold-board and land-side, of the conical rotating point H, shaft F, gearing I M, and supporting-wheel J, operating substantially as described.

JOHN A. QUICK.

Witnesses:
SOLON C. KEMON,
R. C. WEIGHTMAN.